J. C. MacLACHLAN.
REDUCING SEMIFLUID FOOD SUBSTANCES TO DRY POWDERED FORM.
APPLICATION FILED APR. 9, 1921.

1,417,083.   Patented May 23, 1922.

INVENTOR
John C. MacLachlan
BY HIS ATTORNEY
James F. Williamson

UNITED STATES PATENT OFFICE.

JOHN C. MacLACHLAN, OF ST. PAUL, MINNESOTA.

REDUCING SEMIFLUID FOOD SUBSTANCES TO DRY POWDERED FORM.

1,417,083. Specification of Letters Patent. Patented May 23, 1922.

Original application filed August 2, 1920, Serial No. 400,571. Divided and this application filed April 9, 1921. Serial No. 460,057.

*To all whom it may concern:*

Be it known that I, JOHN C. MacLACHLAN, a citizen of the United States, residing at St. Paul, in the county of Ramsey and State of Minnesota, have invented certain new and useful Improvements in Reducing Semifluid Food Substances to Dry Powdered Form; and I do hereby declare the following to be a full, clear, and exact description of the invention, such as will enable others skilled in the art to which it appertains to make and use the same.

This invention relates to a process of preparing a cereal food and particularly to the preparation of such a food from a cooked material or a cereal. While the process as disclosed herein relates particularly to oatmeal, it will be understood that the process can be applied to various cereals such as barley, wheat and the various products made therefrom. The oatmeal or oatmeal flakes forming the well-known commercial article requires as a rule about twenty minutes of cooking to prepare it for serving. This material as a rule is first partially cooked before being prepared for the market. Oatmeal in order to be thoroughly cooked requires several hours of cooking and this cooking process should be carried out by boiling the material and not merely by steaming the same.

It is an object of this invention therefore to produce a dry flour-like material from oatmeal or other cereal which material will have been thoroughly cooked and will retain the original natural flavor of the cereal and which will also be capable of being very quickly prepared for serving.

It is a further object of this process to produce such a product by spraying the thoroughly cooked cereal, thoroughly disintegrating the same and drying the same very rapidly. It is by means of the almost instantaneous drying step that the desirable flavors are retained in the material.

These and other objects of the invention will be apparent from the following description made in connection with the accompanying drawings which are illustrative of one form of apparatus by which the process can be carried out, and, in which like reference characters refer to the same parts in the different views, in which—

Figure 1:
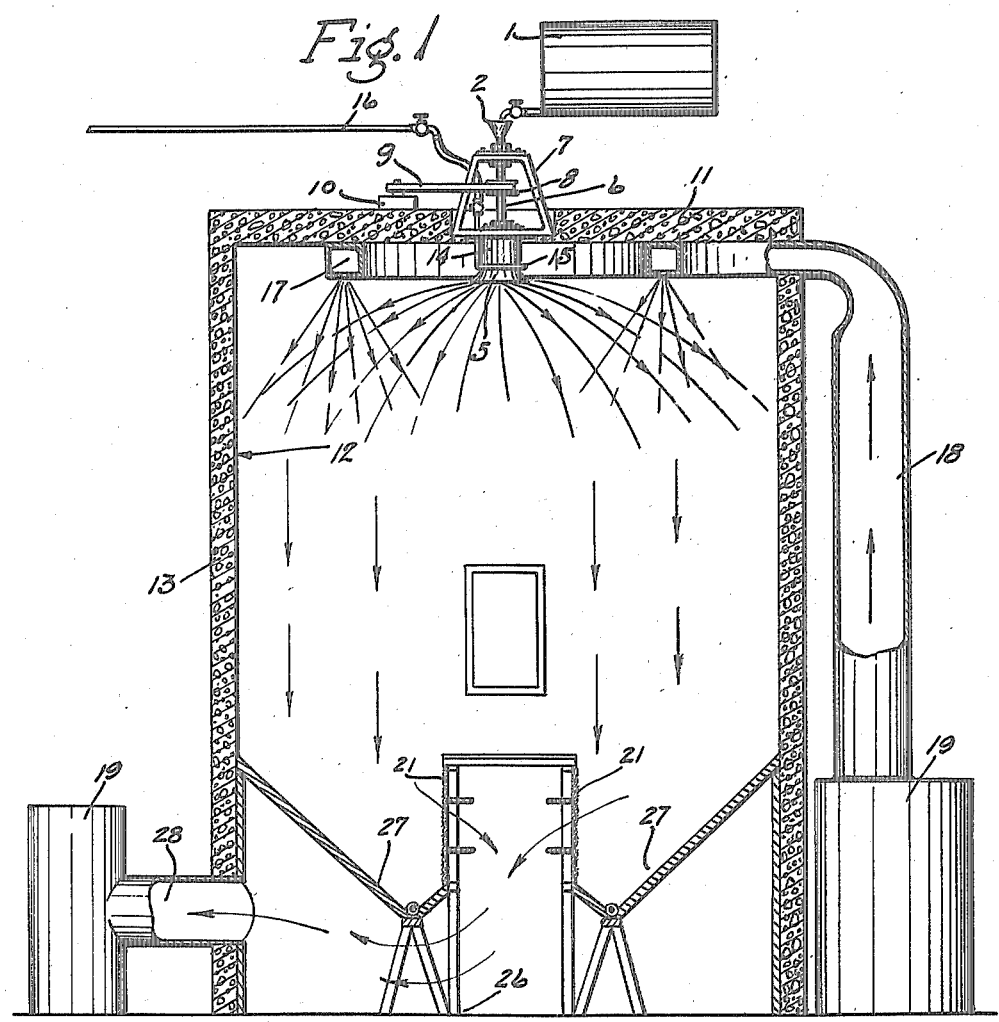
Fig. 1 is a central vertical section of the drying chamber and apparatus.
Figure 2:
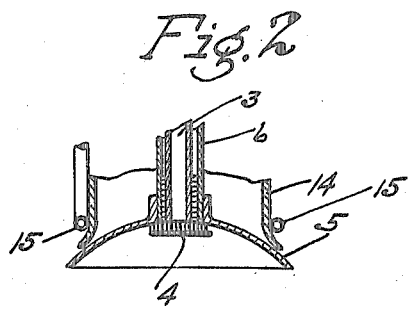
Fig. 2 is a central vertical section on an enlarged scale of a portion of the centrifugal apparatus.

This application is a division of my copending application S. N. 400,571, filed August 2nd, 1920.

In carrying out the process, the oatmeal or other cereal is first thoroughly cooked and this cooking preferably is done in a closed vessel so that the flavor of the material is retained as far as possible. The cooked cereal which is in a semi-fluid condition is then fed to the spraying apparatus. This is preferably of a centrifugal type. In the form of apparatus disclosed in Fig. 1 of the drawings, the semi-fluid cooked cereal will be retained in a tank or vat 1 and will be discharged therefrom through a suitable nozzle or other discharge device through a funnel 2 leading into a central discharge pipe 3. This pipe or tube discharges onto a discharge head or plate 4 which is carried on the under side of a dome-like or semispherical head 5. This head 5 is secured to and carried on the lower end of a rotary spindle 6 disposed in suitable bearings carried in the frame 7 and which has a grooved pulley 8 secured thereto, adapted to receive and be driven by a belt 9 connected to the driving pulley of some suitable motor 10. While the motor and belt have been successfully used in driving the centrifugal discharge head, it has been found in practice that the same can also be suitably driven at high speed by small steam turbine secured to the rotating tube 6 and which will be driven by steam supplied by a pipe connected thereto. The frame 7 is disposed in a recess formed centrally in the tube 11 of a chamber 12 having the side walls 13. A deflecting member 14 depends from the bracket 7 and constitutes a cylindrical member having its lower end flaring and disposed adjacent to the upper surface of the member 5. This member is surrounded by a steam pipe 15 having a suitably valved supply pipe 16 connected thereto and the pipe 15 is formed with a large number of small holes opening through its lower surface. An annular conduit 17 of considerably larger diameter than the member 14 surrounds the latter and is located adjacent the top 11 of the chamber 12. This conduit is connected to a hot air spraying conduit 18 leading from a suitable air heating device 19. The chamber 12 has the runway or passage 20 extending therethrough a portion of the sides of which are formed as screened openings 21. A chamber at each side of the passage 26 is formed with lateral converging troughs 27 which may be provided at a lower portion with a suitable screw or other conveyors. The passage 26 is also open beneath the trough members 27 and a conduit 28 is connected through the side walls of chamber 12 below the said troughs and communicates with a suction chamber 29 which will be provided with a suction fan.

With the above described apparatus, the oatmeal or other cooked cereal which is fed onto the discharge head 4 will be thrown therefrom radially with great force due to the high speed at which the said head is driven. The material will strike the member 5 and be deflected thereby downwardly so as to be thrown in an umbrella-like shower as shown in Fig. 1. Superheated steam is supplied through the pipe 16 and this steam will be directed downwardly through the apertures in pipe 15. It will thus be directed transversely of the film of material being discharged. This steam will act to disintegrate the material into very fine particles by its impact therewith and will also heat the same. As the material travels outwardly, it will be subjected to the blast of hot air which is driven downwardly from the apertures in the conduit 17 and will be practically instantaneously dried thereby. The heating of the material by the highly heated steam will assist the heated air in drying the same. The material will fall into the troughs at the bottom of the chamber and be collected therein as a coarse dry powder.

The material so treated forms a breakfast food of high quality. This food can be quickly made into a porridge for serving by adding water and simply bringing the mixture to a boil or by merely pouring boiling water over the powdered material. The very rapid drying, which drying as stated is substantially instantaneous results in the food retaining its original flavor and this flavor is likewise retained when the material is made into a porridge for serving. It may be stated that the action of the steam as the disintegrating medium, replaces the usual beating action afforded by rotating beaters which which centrifugal discharge heads are usually provided. In treating semi-fluid or heavy fluid substances, it has been found in practice that the material will stick to and accumulate on the beating blades, thus interfering with the proper division and disintegration of material. This objectionable feature is eliminated and a superior disintegrating action is secured by the use of the steam jets as above disclosed.

It will, of course, be understood that various changes may be made in the procedure and succession of the steps of the process and that other forms of apparatus may be used to perform the same without departing from the scope of applicant's invention, which generally stated consists in the matter shown and described and set forth in the appended claims.

What is claimed is:

1. The process of preparing a cereal breakfast food, which consists in thoroughly cooking the cereal, spraying and disintegrating the same and rapidly drying the cereal to form a coarse powdered material.

2. The process of producing a cereal food consisting of thoroughly cooking the cereal, spraying the same centrifugally to finely divide the same and subjecting the same to a very rapid drying to form a coarse dry powdered material.

3. The process of preparing a food from a cereal which consists in thoroughly cooking the cereal, discharging the same centrifugally in an umbrella-like shower in a drying chamber and directing a blast of hot air transversely through the said shower to dry the material and form a coarse powdered product.

4. The process of preparing a breakfast food from a cereal which consists in thoroughly cooking the cereal, discharging the same centrifugally in an umbrella-like shower, directing a blast of hot dry steam transversely through said shower to disintegrate the material and then drying the same very rapidly to form a dry coarse powdered material.

5. The process of preparing a breakfast food from oatmeal which consists in thoroughly cooking the oatmeal, discharging the same while in a semi-fluid condition centrifugally in an umbrella-like shower, directing a blast of hot dry steam through said shower to disintegrate the same, and directing a blast of heated air through said shower to form a dry coarse powdered material.

6. The process of preparing a breakfast food from oatmeal which consists in thoroughly cooking the same, spraying the same centrifugally, disintegrating the material by a blast of hot gaseous medium and then drying the same substantially instantaneously to form a dry coarse powdered material.

7. The process of treating a thoroughly cooked cereal comprising disintegrating and rapidly drying the same while in transit through the air.

8. The process of treating cooked cereal which comprises spraying the same and then while the same is in transit in the air disintegrating the same by the impact of a hot gaseous medium and rapidly drying the same.

9. The process of treating a thoroughly cooked cereal which consists in projecting the same in a shower, and then while in transit in the air disintegrating and rapidly drying the same by impact of hot gaseous media.

In testimony whereof I affix my signature.

JOHN C. MacLACHLAN.